UNITED STATES PATENT OFFICE 2,392,982

WINDSHIELD WIPER

Marcellus T. Flaxman, Ponca City, Okla., assignor to Union Oil Company of California, Los Angeles, Calif., a corporation of California No Drawing. Application August 16, 1943,
Serial No. 498,881

5 Claims. (Cl. 15—245)

This invention relates to the manufacture of rubber objects which are to be lubricated with water, such as rubber bearings, window cleaning squeegees, and especially for the purpose of cleaning glass surfaces exposed to the elements such as automobile windshields which are to be cleared of water due to rain, fog or snow by means of rubber windshield wipers.

The efficiency with which windshield wipers and the like operate is dependent upon the formation of a thin continuous film of water on the glass, or in the case of bearings is dependent upon the film of water on the metal in contact with the rubber bearings.

In the case of windshield wipers, the thinner and more continuous the film of water the better the visibility. While visibility is interfered with by the presence of dirt on a windshield or as a result of scratching caused by the dirt, or as a result of oil scum accumulated from passing motors, I have nevertheless found that the greater proportion of visibility difficulty encountered with automobile windshields and the like is due to the formation of a scum which appears to be a chemical change upon the glass surface due to the presence of alkaline conditions produced either by alkalinity in the windshield wiper or by atmospheric effects upon glass. Commercial windshield wiper blades have the characteristic of permitting the formation of such scum, apparently due to the mentioned alkalinity. The presence of this scum prevents uniform wetting of the glass with water and thereby reduces visibility, and I have found that its removal permits uniform wetting and insures good visibility.

An important object of the invention is to provide a rubber composition for windshield wipers and the like which will prevent the formation of this scum or will result in its removal when formed, whereby to permit uniform wetting of the glass surface and good visibility. Another object of the invention is to insure good formation of water film by means of an agent incorporated in the rubber wiper to reduce the surface tension of the water and insure a good water film.

The invention resides in rubber compositions and also in molded rubber articles which contain a material having an acidic reaction either to make the rubber body neutral in its chemical reaction, or to render it acid, whereby formation of alkaline scum on glass and the like is prevented or removed, or a material to act as a surface tension depressor and thereby constitute a wetting agent. More specifically, the invention resides in a rubber composition suitable for molding into rubber objects such as windshield wipers which contains a material having an acidic reaction either to insure neutrality in the rubber body, or an acid condition in the rubber body; or containing a wetting agent which will reduce surface tension of water when the rubber object acts to spread the water; or containing both types of material. The invention also resides in such a rubber body containing a single material which acts both as a wetting agent and to render the rubber body neutral or acid as indicated.

The agent to be incorporated in the rubber compound should have a sufficiently great activity so that quantities thereof required for the indicated purposes will not damage the usual qualities of the rubber body while providing the required properties.

As examples of suitable materials which have adequate surface tension depressing effects are esters of aliphatic dibasic acids which contain sulfonic acid groups, either as the esters themselves or salts thereof. A sulfonated dibasic acid ester available on the market as "Aerosol OT" and produced by American Cyanamide and Chemical Corporation, and said to be dioctyl sodium sulfo-succinate, is typical of many useful synthetic and other surface tension depressing materials. The material also has a reaction acidic to litmus. Its pH is between 6 and 7. Other wetting agents are similar salts and esters such as mentioned in Patent No. 2,028,091, salts of sulfonated alcohols, and equivalent materials. Neutral or slightly acid wetting agents such as above mentioned are preferred inasmuch as they also impart the neutral or acidic conditions mentioned. Any other compound which will lower the surface tension of water by as much as 50% when from 1% to 3% of the compound is added to water, and which can be conveniently worked into the rubber composition, is a suitable additive.

As examples of materials of acidic reaction which are not wetting agents but are useful to produce a neutral or acidic rubber composition, are benzoic acid, phthalic acid, crotonic acid, succinic acid, and various acid anhydrides such as maleic, phthalic and succinic anhydrides.

The various useable acidic materials and wetting agents are liquids or solids whose boiling or vaporization point or decomposition point is above the ordinary vulcanization temperatures of around 275° F. to 400° F., and are otherwise stable at the vulcanization temperature. The materials above-mentioned meet these requirements. In the case of the wetting agents they should at least be partly soluble in water so as to be slowly liberated when working in contact with water. The acidic materials shall be those which have the capacity of imparting a neutral or acid character to the rubber composition. All of the materials of course are readily incorporated into the rubber composition before vulcanizing. The term "boiling point" as used in the claims is intended to include the decomposition or subliming temperature of materials that do not boil.

As above indicated, agents which have both the property of causing water to wet glass windshields or metal bearings readily and the property of neutralizing or imparting acidic conditions to the rubber composition are the mentioned sulfonated di-basic acid esters such as the succinic acid ester, similar esters such as mentioned in Patent No. 2,028,091 such as the corresponding sulfonated esters of maleic, glutaric, tartaric, fumaric and phthalic acids with various alcohols such as octyl, lauryl, furfuryl, hexyl, amyl, butyl, cyclohexyl alcohols and the glycols, and salts of such esters.

In preparing a rubber composition containing an agent or agents of the type indicated ordinarily about 5% of the agent will be employed. However, smaller proportions possibly as low as 1% may be sufficient according to the nature of the rubber composition and the activity of the particular agent, whereas larger proportions such as 10% may be necessary according as the rubber composition and the nature of the agent varies.

One composition which I have employed consisted of 5% of the mentioned sulfonated succinic acid ester incorporated into an ordinary rubber mix. In this case the composition was about as follows:

|  | Parts by weight |  |
|---|---|---|
| Smoked sheet rubber | 100 | 66% |
| Zinc oxide | 35 | 23% |
| Sulfur | 3 | 2% |
| Stearic acid | 3 | 2% |
| Accelerator | 3 | 2% |
| Aerosol OT (dioctyl sodium sulfo-succinate) | 7 | 5% |

This mix was worked up in a rubber mill by adding the ester to the ordinary rubber mix in the usual way. It was then worked into thin sheets suitable to form windshield wipers and vulcanized for 45 minutes at 292° F. In the vulcanizing operation, stearic acid (which acts as an accelerator for the vulcanization) is neutralized by reaction with part of the zinc oxide and the rubber mix normally would have an alkaline reaction. However, the sulfonated ester apparently is not affected by the zinc oxide and leaves the composition with an acid reaction. At the same time this agent serves as a wetting agent.

The vulcanized sheets were then formed into laminated windshield wipers which were employed for the purpose of clearing windshields in actual service in the usual manner.

Another composition was prepared employing about 5% of benzoic acid. In this particular instance it was desired to make a firmer rubber mix and for that reason about half of the zinc oxide was replaced with iron oxide according to procedures well known in the rubber making art. This composition was similarly vulcanized and formed into windshield wipers which were used in ordinary service.

In using windshield wiper blades manufactured as above described, it was found that visibility was greatly improved and that as pressure upon the glass of the windshield was increased the operation of the blade appeared to become more satisfactory. In the case of the acid ester, which is partly water soluble, the slightly acidic condition imparted by the presence of the ester performed its function and at the same time the wetting function of the agent was permitted to act because a sufficient new supply of the wetting agent became continuously available due to slight penetrating powers of the water for the rubber and to the slight wear of the blade, tending to expose additional quantities of material. Both this blade and the blade made with benzoic acid served to remove scum which interfered with visibility and was already on the windshield, and thereafter to prevent the formation of such a scum, thereby maintaining good visibility conditions during driving in rain and fog.

When employing acidic materials, mineral acids are objectionable because of their decomposition temperatures and their effect upon the rubber. Water-soluble organic acids having the characteristics herein described, may be incorporated in the rubber mix either by mixing them directly therewith on the rubber mill, or by preparing strong solutions and adding the solutions to the rubber mix on the rubber mill, the water being driven out in the milling operation thereby distributing the acid uniformly through the unvulcanized rubber composition. The proportion of these acids used may depend upon the ionization constants. The higher the ionization constant the smaller the amount of acid required for a given rubber mix.

Other compositions may be made employing any preferred rubber compounding procedure with preferred proportions of materials, various agents within the scope of the claims being added in larger or smaller proportions as may seem appropriate or necessary and in accordance with conditions as above indicated.

I claim:

1. A vulcanized rubber windshield wiper containing a small proportion of a sulfonated organic di-basic acid ester.

2. An article according to claim 1 containing in the order of 5% of the succinic acid ester.

3. An article according to claim 1 wherein the ester is dioctyl sodium sulfo-succinate.

4. A rubber glass wiper containing between about 1% and 10% of an organic sulfonated di-basic acid ester.

5. An article according to claim 4 wherein the ester is dioctyl sodium sulfo-succinate.

MARCELLUS T. FLAXMAN.